United States Patent
Su et al.

(10) Patent No.: US 11,703,628 B1
(45) Date of Patent: Jul. 18, 2023

(54) LIGHT GUIDE STRUCTURE

(71) Applicant: Darwin Precisions Corporation, Hsinchu County (TW)

(72) Inventors: Shih-Chieh Su, Hsinchu County (TW); Ya-Fang Huang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/961,946

(22) Filed: Oct. 7, 2022

(30) Foreign Application Priority Data

Jul. 5, 2022 (TW) .................................. 111125224

(51) Int. Cl.
*F21V 8/00* (2006.01)
(52) U.S. Cl.
CPC ......... *G02B 6/0043* (2013.01); *G02B 6/0036* (2013.01)
(58) Field of Classification Search
CPC .. G02B 6/0043; G02B 6/0036; G02B 6/0055; G02B 6/004; G02F 1/133615
See application file for complete search history.

(56) References Cited

U.S. PATENT DOCUMENTS

2020/0271849 A1    8/2020    Chen

FOREIGN PATENT DOCUMENTS

| CN | 207164290 U |   | 3/2018 |
|----|-------------|---|--------|
| KR | 20110101465 A | * | 1/2011 |
| KR | 101135043 B1 | * | 4/2012 |
| KR | 20120032205 A | * | 4/2012 |
| KR | 20120068498 A | * | 6/2012 |
| KR | 20160138624 A | * | 12/2016 |
| KR | 20170020589 A | * | 2/2017 |

* cited by examiner

*Primary Examiner* — Erin Kryukova
(74) *Attorney, Agent, or Firm* — WPAT, P.C

(57) ABSTRACT

A light guide structure includes a light guide plate, a light emitting unit, and a plurality of micro-structures. The light guide plate has a light incident surface, a plurality of non-light-emitting surfaces, a reflective surface, and a light emitting surface. The light incident surface and one of the non-light-emitting surfaces are oppositely disposed, and the reflective surface and the light emitting surface are oppositely disposed. The light emitting unit is configured to emit light through the light incident surface. The micro-structures are disposed on the non-light-emitting surfaces and are configured to scatter the light.

16 Claims, 11 Drawing Sheets

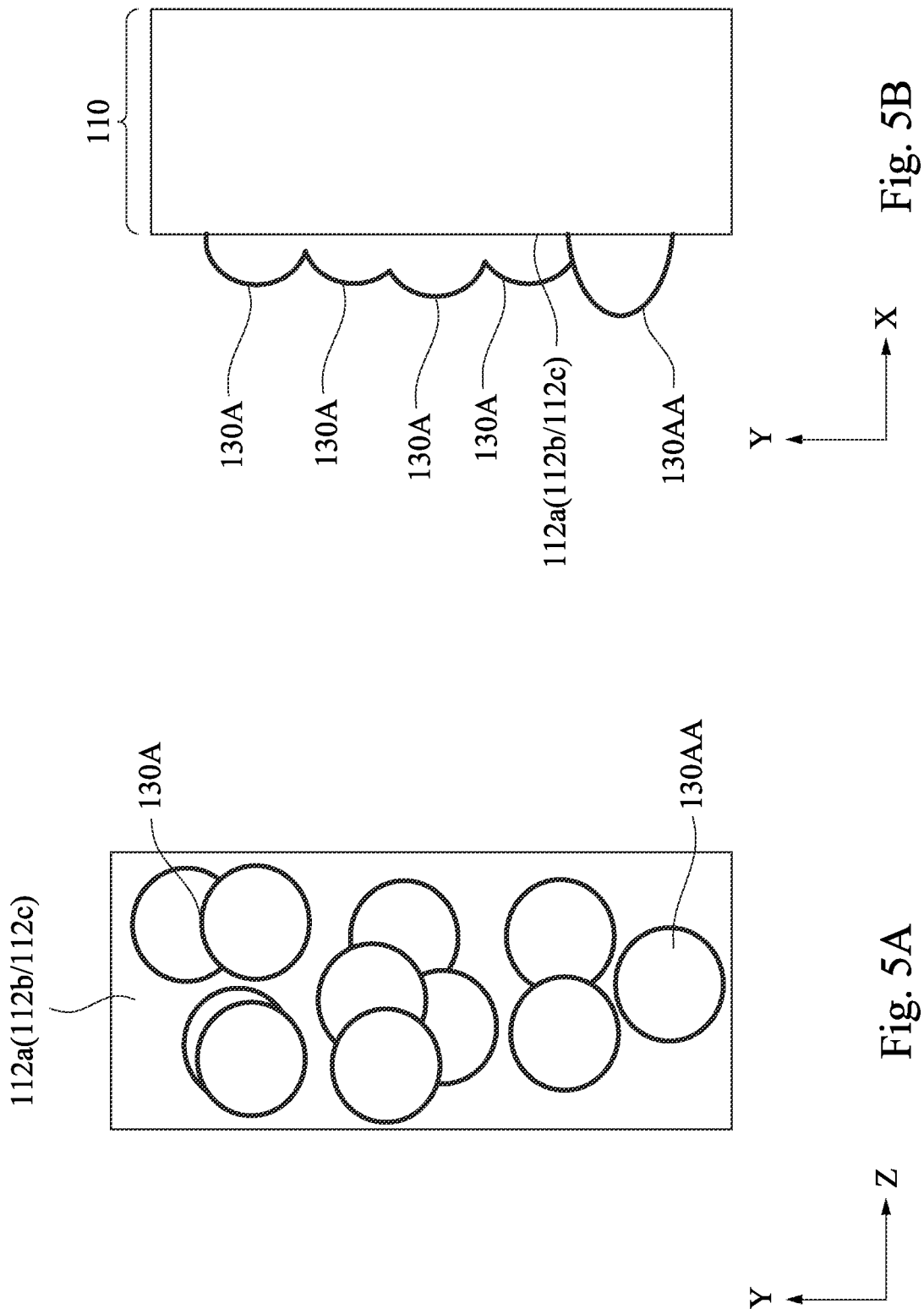

LIGHT GUIDE STRUCTURE

CROSS-REFERENCE TO RELATED APPLICATION

This application claims priority to Taiwan Application Serial Number 111125224, filed Jul. 5, 2022, which is herein incorporated by reference in its entirety.

BACKGROUND

Field of Invention

The present disclosure relates to a light guide structure.

Description of Related Art

The light guide structure is used in electronic devices such as tablet computers, e-books, or vehicle panels. How to propose a light guide structure that can increase the light scattering efficiency is one of the problems that the industry is eager to solve by investing research and development resources.

SUMMARY

In view of this, one purpose of present disclosure is to provide a light guide structure that can solve the aforementioned problems.

In order to achieve the above objective, according to an embodiment of the present disclosure, a light guide structure includes a light guide plate, a light emitting unit, and a plurality of micro-structures. The light guide plate has a light incident surface, a plurality of non-light-emitting surfaces, a reflective surface, and a light emitting surface. The light incident surface and one of the non-light-emitting surfaces are oppositely disposed, and the reflective surface and the light emitting surface are oppositely disposed. The light emitting unit is configured to emit light through the light incident surface. The micro-structures are disposed on the non-light-emitting surfaces and are configured to scatter the light.

In one or more embodiments of the present disclosure, the micro-structures protrude outward from the non-light-emitting surfaces.

In one or more embodiments of the present disclosure, the micro-structures are recessed inward from the non-light-emitting surfaces.

In one or more embodiments of the present disclosure, a cross section of the micro-structures on the non-light-emitting surfaces is circular.

In one or more embodiments of the present disclosure, at least two of the micro-structures overlap each other.

In one or more embodiments of the present disclosure, the micro-structures are formed by a hot pressing process, an injection process, or an ultraviolet (UV) imprinting process.

In one or more embodiments of the present disclosure, the micro-structures are partially overlapped.

In one or more embodiments of the present disclosure, the micro-structures are completely overlapped.

In one or more embodiments of the present disclosure, the light guide structure further comprises a rounded edge connected between one of the non-light-emitting surfaces and the light emitting surface.

In one or more embodiments of the present disclosure, the light guide structure further comprises a rounded edge connected between one of the non-light-emitting surfaces and the reflective surface.

In one or more embodiments of the present disclosure, the light guide structure further comprises a rounded edge connected between one of the non-light-emitting surfaces and the light emitting surface and between one of the non-light-emitting surfaces and the reflective surface.

In order to achieve the above objective, according to an embodiment of the present disclosure, a light guide structure includes a light guide plate, a light emitting unit, and a plurality of micro-structures. The light guide plate has a light incident surface, a plurality of non-light-emitting surfaces, a reflective surface, and a light emitting surface. The light incident surface and one of the non-light-emitting surfaces are oppositely disposed, and the reflective surface and the light emitting surface are oppositely disposed. The light emitting unit is configured to emit light through the light incident surface. The micro-structures are disposed on the non-light-emitting surfaces and are configured to scatter the light. The micro-structures are arc-shaped cylinders.

In one or more embodiments of the present disclosure, a cross section of the micro-structures parallel to the reflective surface or the light emitting surface is semicircular.

In one or more embodiments of the present disclosure, the micro-structures are elongated in a direction extending from the reflective surface to the light emitting surface.

In one or more embodiments of the present disclosure, the micro-structures have a height extending perpendicular to the non-light-emitting surfaces and a width extending parallel to the non-light-emitting surfaces, and the height is smaller than the width.

In one or more embodiments of the present disclosure, the micro-structures have a distance in between extending parallel to the non-light-emitting surfaces, and the distance is greater than or equal to 0 and less than or equal to 10 times the width.

In order to achieve the above objective, according to an embodiment of the present disclosure, a light guide structure includes a light guide plate, a light emitting unit, and a rounded edge. The light guide plate has a light incident surface, a plurality of non-light-emitting surfaces, a reflective surface, and a light emitting surface. The light incident surface and one of the non-light-emitting surfaces are oppositely disposed, and the reflective surface and the light emitting surface are oppositely disposed. The light emitting unit is configured to emit light through the light incident surface. The rounded edge is disposed on edges of the light guide structure and is configured to scatter the light.

In one or more embodiments of the present disclosure, the rounded edge is connected between one of the non-light-emitting surfaces and the light emitting surface.

In one or more embodiments of the present disclosure, the rounded edge is connected between one of the non-light-emitting surfaces and the reflective surface.

In one or more embodiments of the present disclosure, the rounded edge is connected between one of the non-light-emitting surfaces and the light emitting surface and between one of the non-light-emitting surfaces and the reflective surface.

In summary, in the light guide structure of the present disclosure, since the light guide structure is provided with micro-structures and/or rounded edges, light can be scattered in the light guide plate, except that the brightness of the dark area can be compensated, the light extraction efficiency of the light guide structure can also be increased.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 5A is a schematic view of the micro-structures in accordance with an embodiment of present disclosure;

FIG. 5B is another schematic view of the micro-structures in accordance with an embodiment of present disclosure;

DETAILED DESCRIPTION

Figure 1:
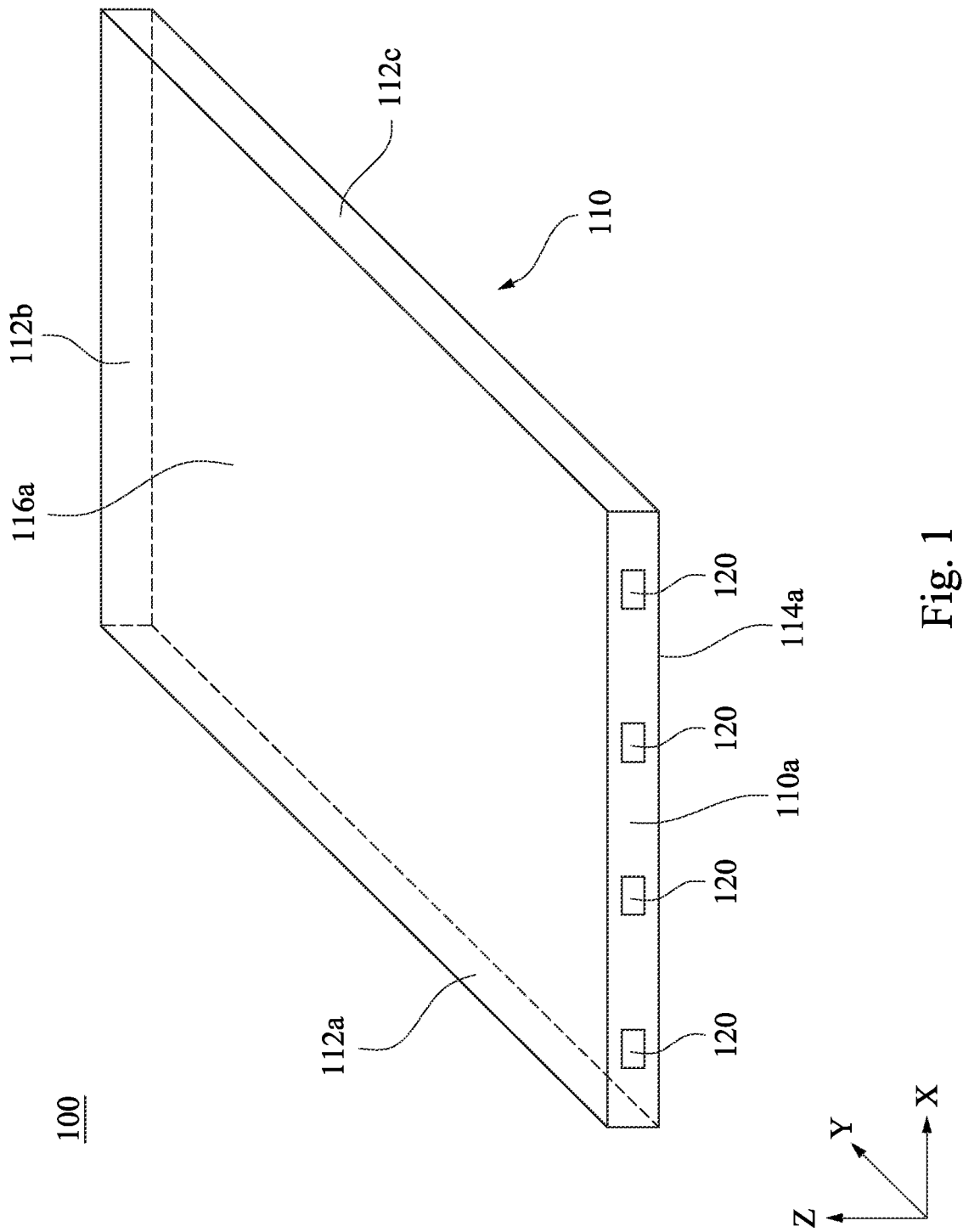
FIG. 1 is a schematic view of a light guide structure in accordance with an embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

In the drawings, the thickness of layers, films, panels, regions, etc., are exaggerated for clarity. Throughout the specification, the same reference numerals refer to the same elements. It will be understood that when an element such as a layer, film, region or substrate is referred to as being "on" or "connected to" another element, it can be directly on or connected to the other element, or Intermediate elements may also be present. In contrast, when an element is referred to as being "directly on" or "directly connected to" another element, there are no intervening elements present. As used herein, "connected" may refer to a physical and/or electrical connection. Furthermore, "electrically connected" or "coupled" may refer to the existence of other elements between the two elements.

The terminology used herein is for the purpose of describing particular embodiments only and is not limiting. As used herein, the singular forms "a," "an," and "the" are intended to include the plural forms including "at least one" unless the content clearly dictates otherwise. "Or" means "and/or". As used herein, the term "and/or" includes any and all combinations of one or more of the associated listed items. It will also be understood that, when used in this specification, the terms "comprising" and/or "comprising" designate the stated feature, region, integer, step, operation, presence of an element and/or part, but do not exclude the presence or addition of one or more other features, entireties of regions, steps, operations, elements, components, and/or combinations thereof.

Furthermore, relative terms such as "lower" or "bottom" and "upper" or "top" may be used herein to describe one element's relationship to another element, as shown in the figures. It should be understood that relative terms are intended to encompass different orientations of the device in addition to the orientation shown in the figures. For example, if the device in one of the figures is turned over, elements described as being on the "lower" side of other elements would then be oriented on "upper" sides of the other elements. Thus, the exemplary term "lower" may include an orientation of "lower" and "upper", depending on the particular orientation of the drawings. Similarly, if the device in one of the figures is turned over, elements described as "below" or "beneath" other elements would then be oriented "above" the other elements. Thus, the exemplary terms "below" or "under" can include an orientation of above and below.

As used herein, "about", "approximately", or "substantially" includes the stated value and the average value within an acceptable deviation of the particular value as determined by one of ordinary skill in the art, considering the discussed specific amount of measurement and measurement-related error (i.e., the limitations of the measurement system). For example, "about" can mean within one or more standard deviations of the stated value, or within ±30%, ±20%, ±10%, ±5%. Furthermore, as used herein, "about", "approximately" or "substantially" may be used to select a more acceptable range of deviation or standard deviation depending on optical properties, etching properties or other properties, and not one standard deviation may apply to all properties.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be construed as having meanings consistent with their meanings in the context of the related art and the present disclosure, and are not to be construed as idealized or excessively formal meaning, unless expressly defined as such herein.

The structure and function of each element included in a light guide structure 100 of this embodiment and the connection relationship between the elements will be described in detail below.

Reference is made to FIG. 1. FIG. 1 is a schematic view of the light guide structure 100 according to an embodiment of the present disclosure. In this embodiment, the light guide structure 100 includes a light guide plate 110 and a light emitting unit 120. The light emitting unit 120 is configured to emit light. The light guide plate 110 is configured to scatter the light emitted by the light emitting unit 120. As shown in FIG. 1, the light emitting unit 120 is disposed on one side of the light guide plate 110 and adjacent to the light guide plate 110. More detailed elements of the light guide structure 100 will be described below.

In this embodiment, as shown in FIG. 1, the light guide plate 110 has a light incident surface 110a, a non-light-emitting surface 112a, a non-light-emitting surface 112b, a non-light-emitting surface 112c, a reflective surface 114a, and a light emitting surface 116a. The light incident surface 110a is configured to receive light. The non-light-emitting surface 112a, the non-light-emitting surface 112b, and the non-light-emitting surface 112c are configured to scatter the light. The reflective surface 114a is configured to reflect the light. The light emitting surface 116a is configured for the light to pass through.

As shown in FIG. 1, in some embodiments, the light incident surface 110a and the non-light-emitting surface 112b are oppositely disposed. Specifically, the light incident surface 110a and the non-light-emitting surface 112b are located on opposite sides of the light guide plate 110 and are arranged in Y-direction. In some embodiments, the non-light-emitting surface 112a and the non-light-emitting surface 112c are oppositely disposed. Specifically, the non-light-emitting surface 112a and the non-light-emitting surface 112c are located on opposite sides of the light guide plate 110 and are arranged in the X-direction. In some embodiments, the reflective surface 114a and the light emitting surface 116a are oppositely disposed. Specifically, the reflective surface 114a and the light emitting surface 116a are located on opposite sides of the light guide plate 110 and are arranged in the Z-direction.

Figure 2B:
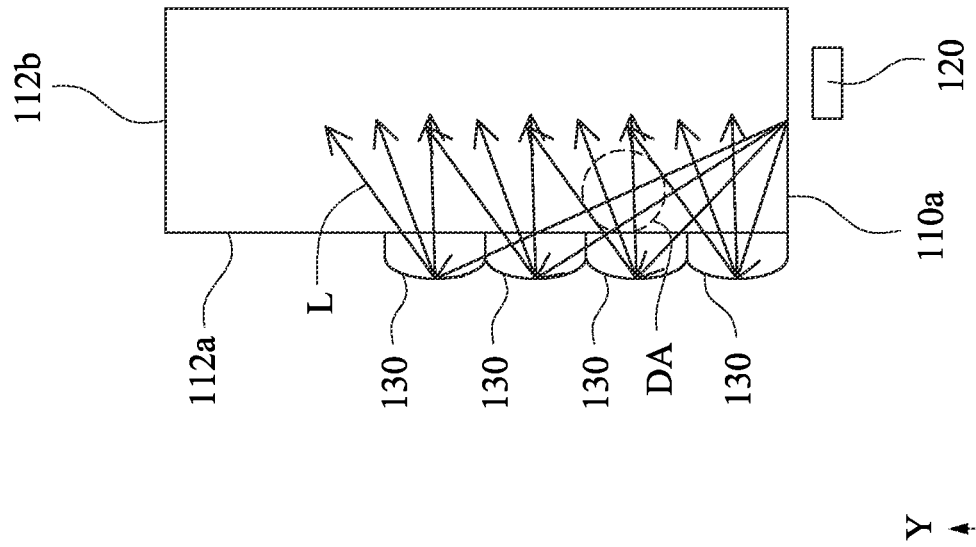
FIG. 2B is a partial top view of the light guide structure in accordance with an embodiment of present disclosure.
Figure 2A:
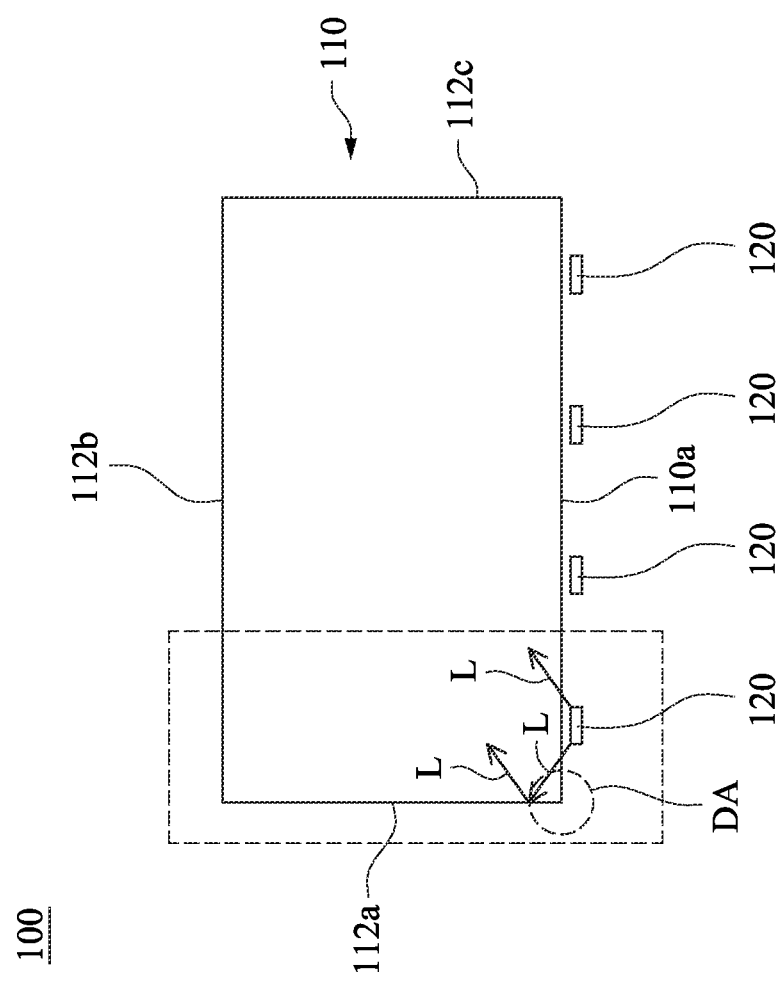
FIG. 2A is a top view of the light guide structure in accordance with an embodiment of present disclosure.

Reference is made to FIG. 2A. FIG. 2A is a top view of the light guide structure 100 according to an embodiment of the present disclosure. In this embodiment, as shown in FIG. 2A, the light emitting unit 120 is configured to emit light L, and the light L emitted by the light emitting unit 120 enters the light guide plate 110 from the light incident surface 110a, and the light L is then scattered by, for example, the non-light-emitting surface 112a. After the light L is scattered by the non-light-emitting surface 112a, the brightness of a dark area DA in a peripheral area of the light guide plate 110 can be increased, as shown in FIG. 2A.

Reference is made to FIG. 2B. FIG. 2B is a partial top view of the light guide structure 100 based on FIG. 2A according to an embodiment of the present disclosure. As shown in FIG. 2B, the light guide structure 100 further includes a plurality of micro-structures 130. In this embodiment, the micro-structure 130 is a light-transmitting material and has an arc surface on a side away from the non-light-emitting surface 112a, as shown in FIG. 2B. In some embodiments, the micro-structures 130 are disposed on the non-light-emitting surface 112a. In some embodiments, the micro-structures 130 extend from the non-light-emitting surface 112a. As shown in FIG. 2B, the light L emitted by the light emitting unit 120 enters the light guide plate 110 from the light incident surface 110a, and the light L is scattered by the micro-structures 130 disposed on, for example, the non-light-emitting surface 112a. After the light L is scattered by the micro-structures 130, the brightness of the dark area DA in the peripheral area of the light guide plate 110 can be increased, as shown in FIG. 2B.

In some embodiments, the micro-structures 130 may be disposed on the non-light-emitting surface 112b and/or the non-light-emitting surface 112c.

Figure 3:
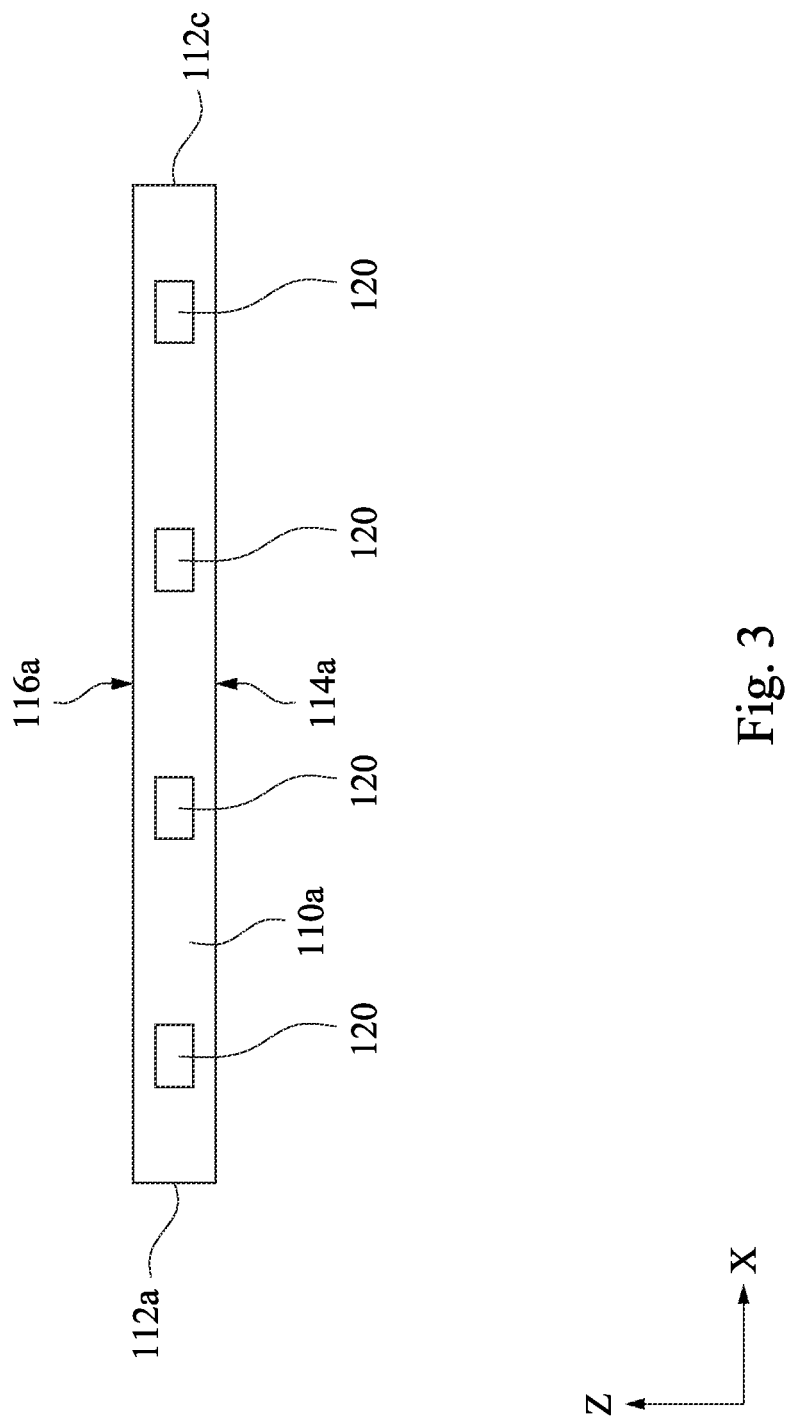
FIG. 3 is a side view of the light guide structure in accordance with an embodiment of present disclosure.

Reference is made to FIG. 3. FIG. 3 is a side view of the light guide structure 100 according to an embodiment of the present disclosure. As shown in FIG. 3, the light emitting units 120 is disposed adjacent to the light incident surface 110a. In some embodiments, as shown in FIG. 3, the light emitting units 120 are arranged in the X-direction. It should be noted that FIG. 3 shows four light emitting units 120, but the present disclosure does not intend to limit the quantity of the light emitting units 120.

With the aforementioned structural configuration, when the light emitting unit 120 emits the light L toward the light guide plate 110, the light L can enter the light guide plate 110 from the light incident surface 110a, then be scattered by, for example, the micro-structures 130 disposed on the non-light-emitting surface 112a, the non-light-emitting surface 112b, and the non-light-emitting surface 112c, and then penetrate the light emitting surface 116a by the reflection of the reflective surface 114a. The scattering of the light L through the micro-structure 130 can increase the light extraction efficiency of the light guide structure 100, thereby achieving the effect of light compensation the dark area DA.

In some embodiments, the light guide plate 110 may include PMMA (polymethyl methacrylate) resin or other suitable materials. In some embodiments, the light emitting unit 120 may be an LED light source or other possible light sources. In some embodiments, a material of the micro-structure 130 is the same as a material of the light guide plate 110. In some embodiments, the micro-structures 130 are formed by a hot pressing process, an injection process, or an ultraviolet (UV) Imprinting process.

Next, other embodiments of the light guide structure 100 of the present disclosure are described herein.

Figure 4B:
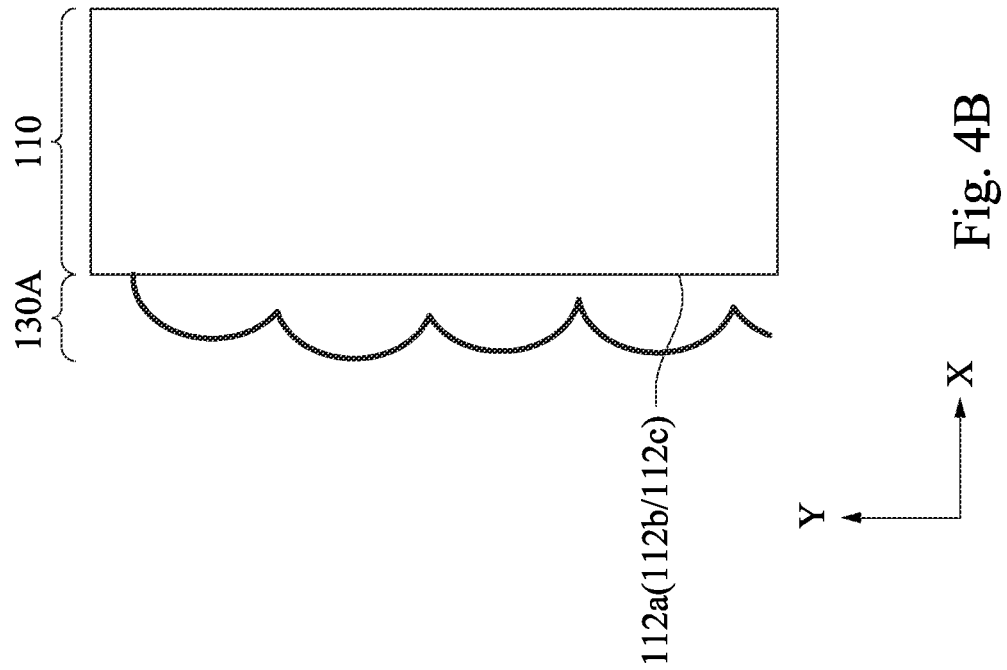
FIG. 4B is another schematic view of the micro-structures in accordance with an embodiment of present disclosure.
Figure 4A:
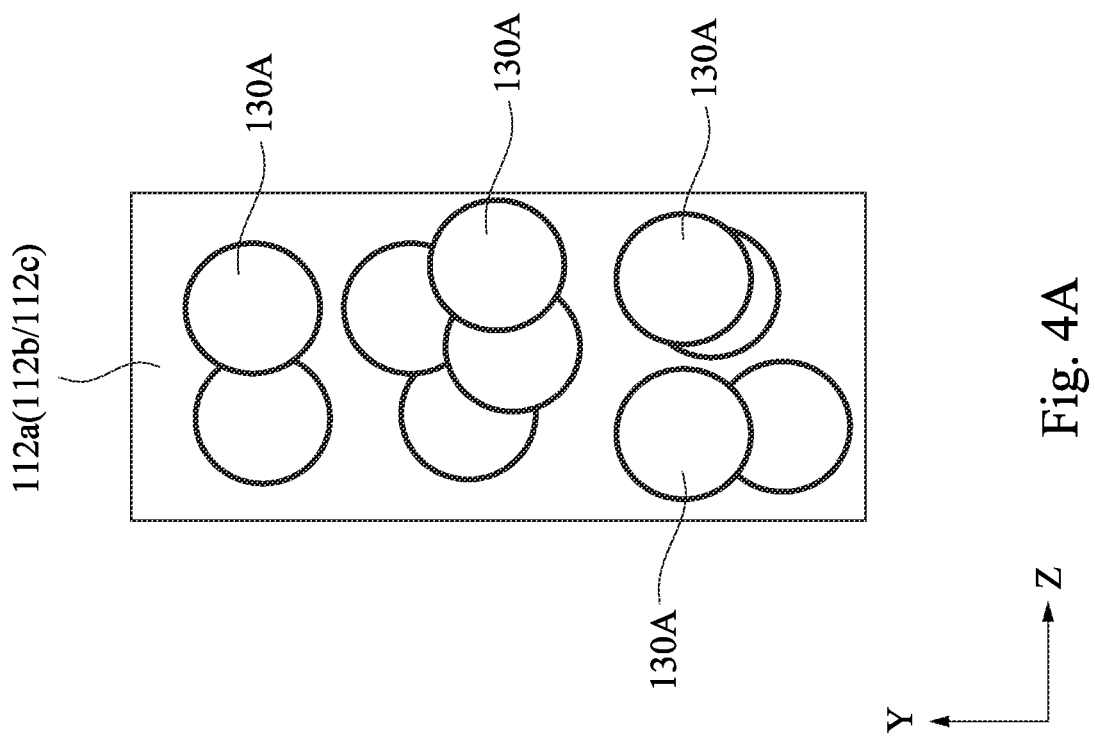
FIG. 4A is a schematic view of micro-structures in accordance with an embodiment of present disclosure.

Reference is made to FIG. 4A. FIG. 4A is a schematic view of micro-structures 130A according to an embodiment of the present disclosure. In this embodiment, as shown in FIG. 4A, the micro-structures 130A are disposed on the non-light-emitting surface 112a and/or the non-light-emitting surface 112b and/or the non-light-emitting surface 112c of the light guide plate 110. As shown in FIG. 4A, a cross section of the micro-structures 130A on the non-light-emitting surface 112a and/or the non-light-emitting surface 112b and/or the non-light-emitting surface 112c is circular. In some embodiments, at least two of the micro-structures 130A overlap each other. For example, as shown in FIG. 4A, the micro-structures 130A may overlap two by two. Alternatively, there may be more than three micro-structures 130A overlapping each other. As shown in FIG. 4A, there may be four micro-structures 130A overlapping each other.

Reference is made to FIG. 4B. FIG. 4B is another schematic view of the micro-structures 130A according to an embodiment of the present disclosure. In this embodiment, as shown in FIG. 4A, the micro-structures 130A protrude outward from the non-light-emitting surface 112a and/or the non-light-emitting surface 112b and/or the non-light-emitting surface 112c.

Next, other embodiments of the light guide structure 100 of the present disclosure are described herein.

Reference is made to FIG. 5A. FIG. 5A is a schematic view of the micro-structures 130A and a micro-structure 130AA according to an embodiment of the present disclosure. In this embodiment, as shown in FIG. 5A, the non-light-emitting surface 112a and/or the non-light-emitting surface 112b and/or the non-light-emitting surface 112c of the light guide plate 110 are provided with the micro-structure 130AA in addition to the micro-structures 130A. As shown in FIG. 5A, a cross section of the micro-structure 130AA on the non-light-emitting surface 112a and/or the non-light-emitting surface 112b and/or the non-light-emitting surface 112c is circular. In some embodiments, at least two micro-structures 130A may completely overlap. Specifically, as shown in FIG. 5A, the two micro-structures 130A can be completely overlapped, so that their cross sections on the non-light-emitting surface 112a and/or the non-light-emitting surface 112b and/or the non-light-emitting surface 112c and the cross section of single micro-structure 130A on the non-light-emitting surface 112a and/or the non-light-emitting surface 112b and/or the non-light-emitting surface 112c are in the same circular shape. Therefore, in some embodiments, the micro-structure 130AA is substantially formed by the overlapped two micro-structures 130A.

Reference is made to FIG. 5B. FIG. 5B is another schematic view of the micro-structures 130A and the micro-structure 130AA according to an embodiment of the present disclosure. In this embodiment, as shown in FIG. 5B, the micro-structure 130AA protrudes outward from the non-light-emitting surface 112a and/or the non-light-emitting surface 112b and/or the non-light-emitting surface 112c.

Next, other embodiments of the light guide structure 100 of the present disclosure are described herein.

Figure 6B:
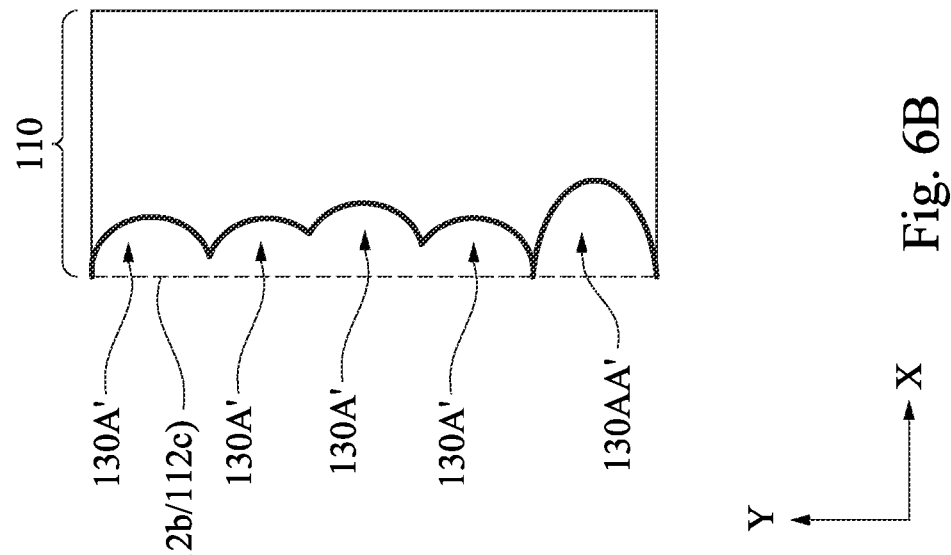
FIG. 6B is another schematic view of the micro-structures in accordance with an embodiment of present disclosure.
Figure 6A:
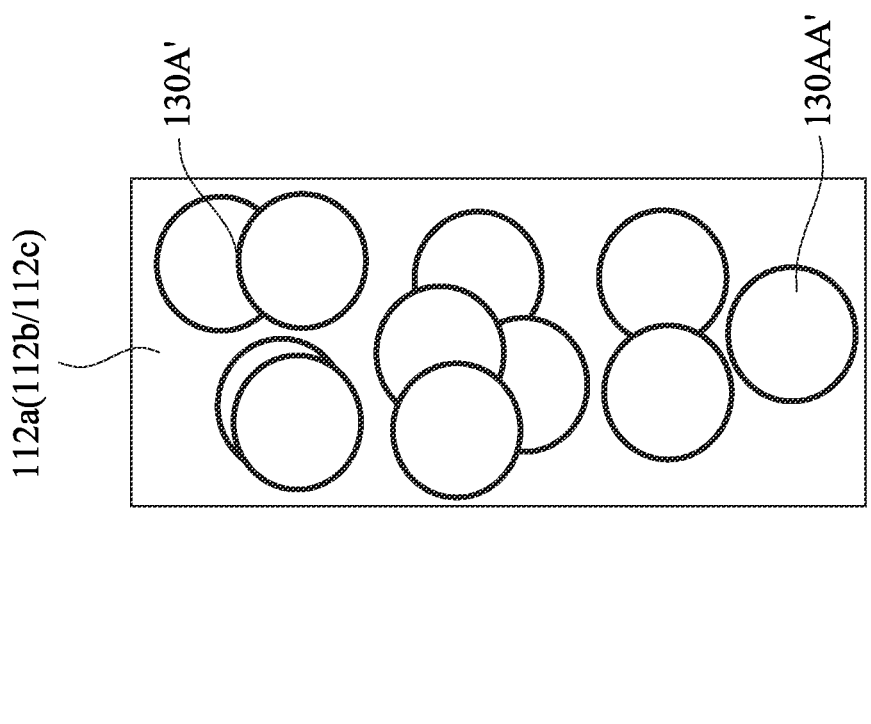
FIG. 6A is a schematic view of the micro-structures in accordance with an embodiment of present disclosure.

Reference is made to FIG. 6A and FIG. 6B. FIGS. 6A and 6B are schematic views of different viewing angles of micro-structures 130A' and a micro-structure 130AA', respectively, according to an embodiment of the present disclosure. The configurations of the micro-structures 130A' and the micro-structure 130AA' in FIGS. 6A and 6B are similar to the configurations of the micro-structures 130A and the micro-structure 130AA in FIGS. 5A and 5B, except that the micro-structures 130A' and the micro-structure 130AA' shown in FIGS. 6A and 6B are recessed inward from the non-light-emitting surface 112a and/or the non-light-emitting surface 112b and/or the non-light-emitting surface 112c.

With the aforementioned structural configuration, the light emitting unit 120 emits the light L toward the light guide plate 110, and the light L is then scattered by the micro-structures 130A, the micro-structure 130AA, the micro-structures 130A', and the micro-structure 130AA' disposed on, for example, the non-light-emitting surface 112a, the non-light-emitting surface 112b, and the non-light-emitting surface 112c, and the brightness of the dark area DA is increased about 16% relative to the brightness of the dark area DA without the micro-structures 130A, the micro-structure 130AA, the micro-structures 130A', and the micro-structure 130AA'. The light guide structure 100 provided with the micro-structures 130A, the micro-structure 130AA, the micro-structures 130A', and the micro-structure 130AA' can achieve the effect of increasing the light extraction efficiency.

In some embodiments, the micro-structures 130A, 130AA, 130A', and 130AA' are formed by a hot pressing process, an injection process, or a UV Imprinting process.

Next, other embodiments of the light guide structure 100 of the present disclosure are described herein.

Figure 7B:
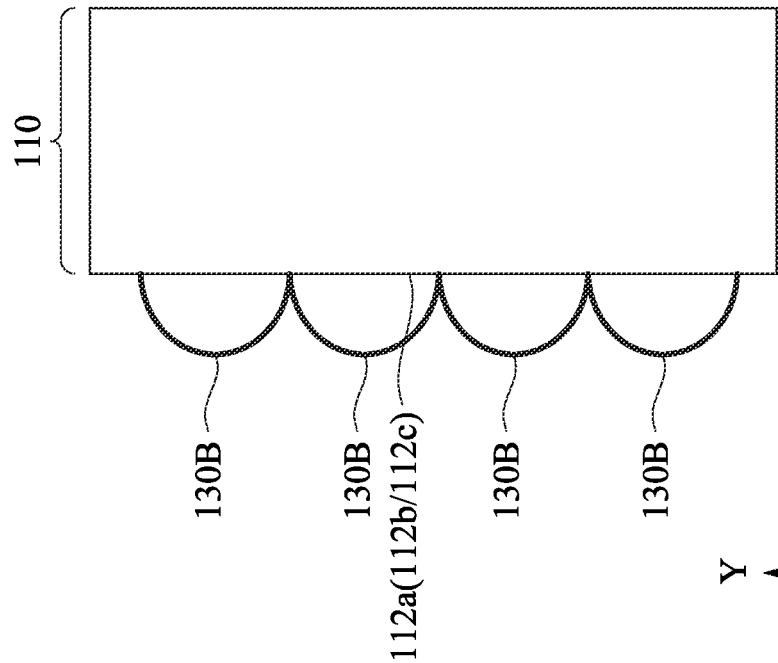
FIG. 7B is another schematic view of the micro-structures in accordance with an embodiment of present disclosure.
Figure 7A:
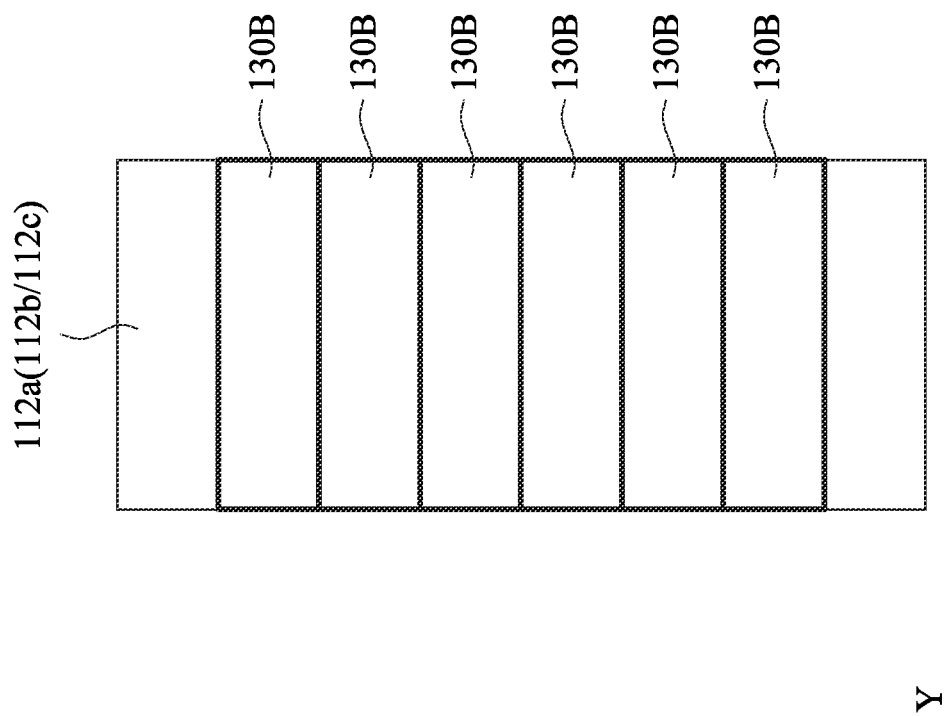
FIG. 7A is a schematic view of the micro-structures in accordance with an embodiment of present disclosure.

Reference is made to FIG. 7A and FIG. 7B. FIGS. 7A and 7B are schematic views of different viewing angles of micro-structures 130B according to an embodiment of the present disclosure, respectively. In this embodiment, as shown in FIGS. 7A and 7B, the micro-structures 130B are disposed on the non-light-emitting surface 112a and/or the non-light-emitting surface 112b and/or the non-light-emitting surface 112c of the light guide plate 110. In this embodiment, the micro-structures 130B are arc-shaped cylinders. For example, as shown in FIG. 7A, the micro-structures 130B are elongated in a direction (for example, Z-direction) extending from the reflective surface 114a to the light emitting surface 116a. As shown in FIG. 7B, the micro-structure 130B is a semi-cylinder. As shown in FIG. 7B, a cross section of the micro-structures 130B parallel to the reflective surface 114a or the light emitting surface 116a is semicircular. As shown in FIG. 7B, the micro-structures 130B protrude outward from the non-light-emitting surface 112a and/or the non-light-emitting surface 112b and/or the non-light-emitting surface 112c.

Figure 8:
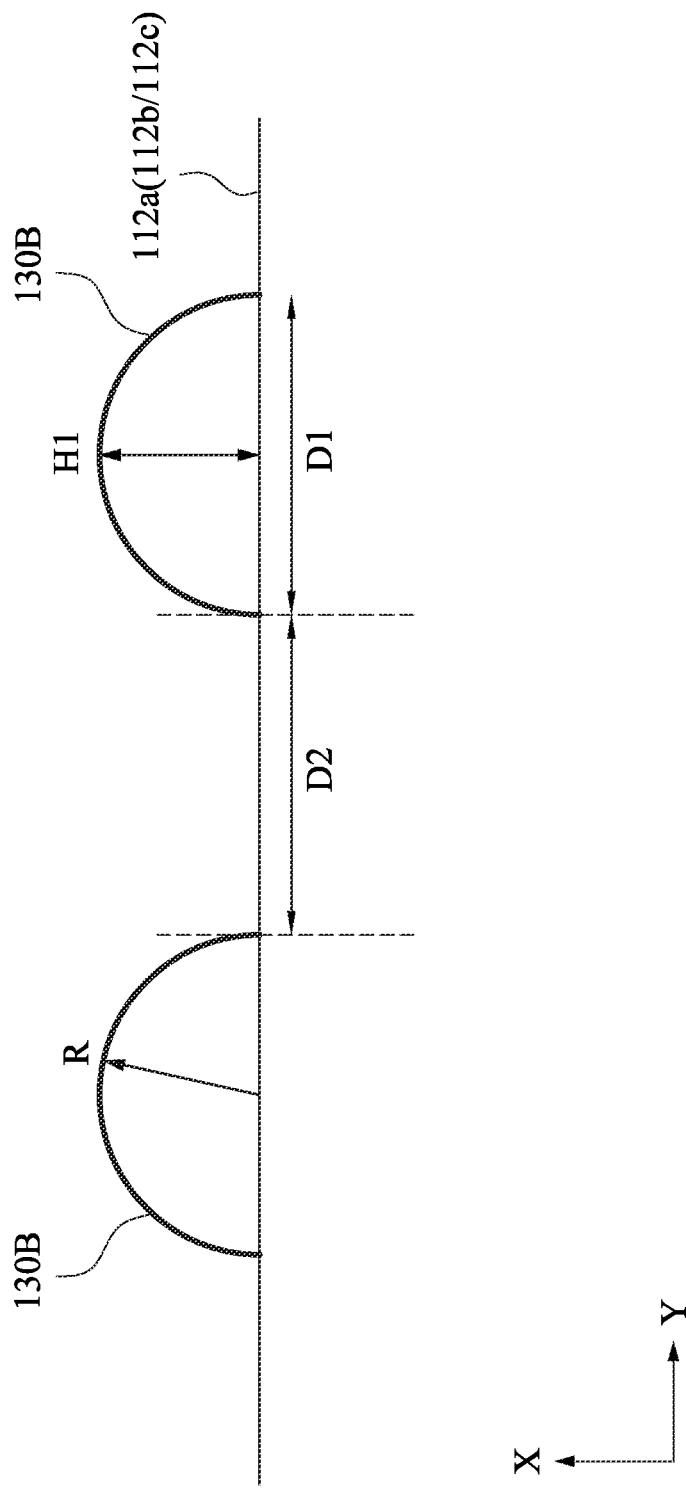
FIG. 8 is another schematic view of the micro-structures in accordance with an embodiment of present disclosure.

Reference is made to FIG. 8. FIG. 8 is another schematic view of the micro-structures 130B according to an embodiment of the present disclosure. In this embodiment, as shown in FIG. 8, each of the micro-structures 130B has a radius R, a height H1, and a width D1. The height H1 extends perpendicular to the non-light-emitting surface 112a and/or the non-light-emitting surface 112b and/or the non-light-emitting surface 112c. The width D1 extends parallel to the non-light-emitting surface 112a and/or the non-light-emitting surface 112b and/or the non-light-emitting surface 112c. In this embodiment, the height H1 is less than the width D1. In embodiments where the micro-structures 1308 are half-cylinders, the width D1 is substantially equal to twice the height H1, and the radius R is equal to the height H1. In this embodiment, as shown in FIG. 8, a distance D2 is between the two micro-structures 1308. The distance D2 extends parallel to the non-light-emitting surface 112a and/or the non-light-emitting surface 112b and/or the non-light-emitting surface 112c. In this embodiment, the distance D2 is greater than or equal to 0, and the distance D2 is less than or equal to about 10 times the width D1.

With the aforementioned structural configuration, the light emitting unit 120 emits the light L toward the light guide plate 110, and the light L is scattered by the micro-structures 1308 disposed on, for example, the non-light-emitting surface 112a, the non-light-emitting surface 112b, and the non-light-emitting surface 112c, and the brightness of the dark area DA is increased about 21% relative to the brightness of the dark area DA without the micro-structures 1308. The light guide structure 100 provided with the micro-structures 1308 can achieve the effect of increasing the light extraction efficiency.

In some embodiments, the micro-structures 1308 are formed by a hot pressing process, an injection process, or a UV Imprinting process.

Next, other embodiments of the light guide structure 100 of the present disclosure are described herein.

Figure 9:
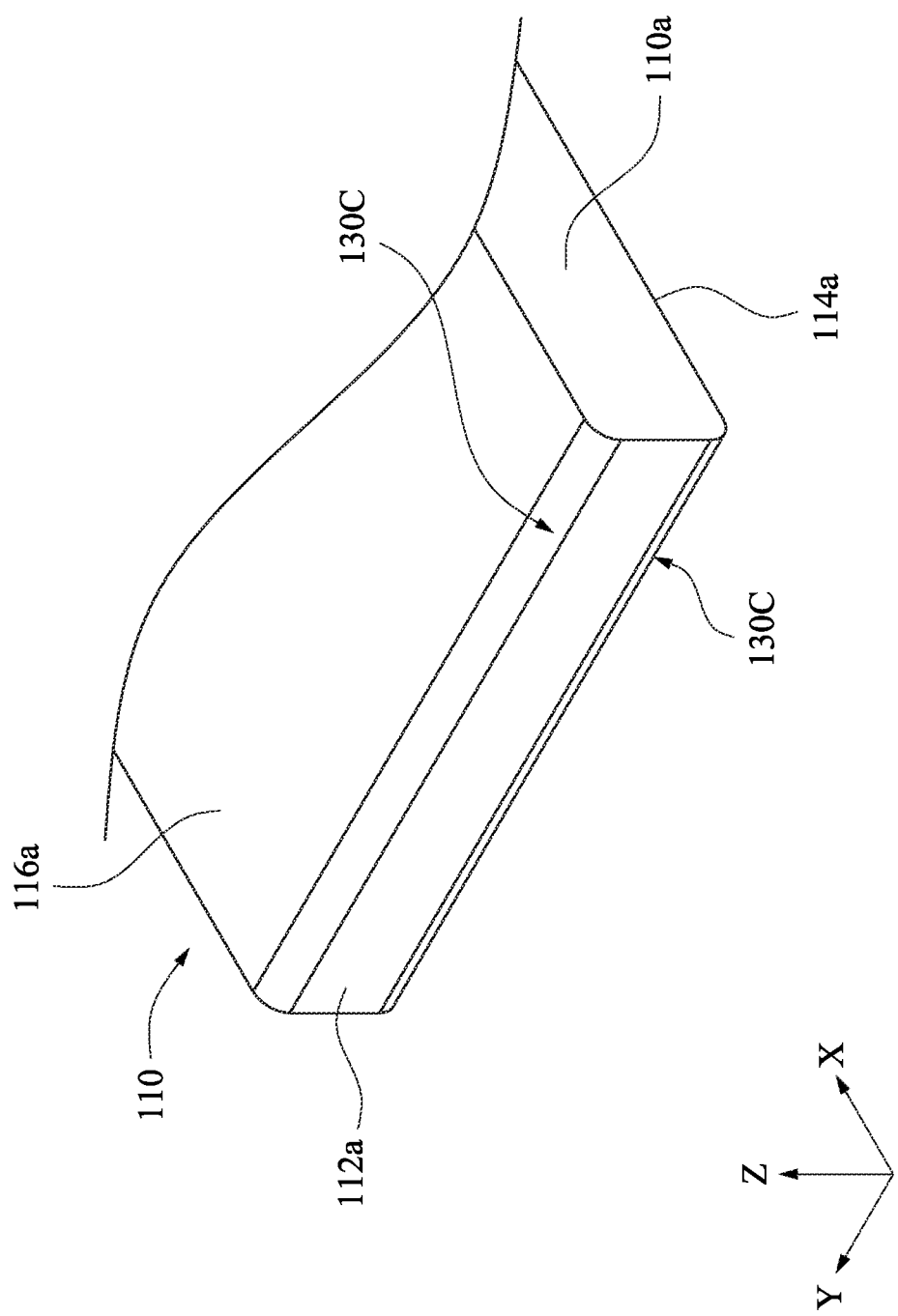
FIG. 9 is a schematic view of the light guide structure with rounded edges in accordance with an embodiment of present disclosure.

Reference is made to FIG. 9. FIG. 9 is a schematic view of a rounded edge 130C according to an embodiment of the present disclosure. In this embodiment, as shown in FIG. 9, a plurality of rounded edges 130C are provided on edges of the light guide plate 110. Specifically, as shown in FIG. 9, one of the rounded edges 130C is connected between the non-light-emitting surface 112a and the light emitting surface 116a, and another one of the rounded edges 130C is connected between the non-light-emitting surface 112a and the reflective surface 114a.

In some embodiments, the rounded edges 130C are connected between the non-light-emitting surface 112b and the light emitting surface 116a, and the rounded edges 130C are connected between the non-light-emitting surface 112b and the reflective surface 114a. Alternatively, in some embodiments, the rounded edges 130C are connected between the non-light-emitting surface 112c and the light emitting surface 116a, and the rounded edges 130C are connected between the non-light-emitting surface 112c and the reflective surface 114a.

Figure 10:
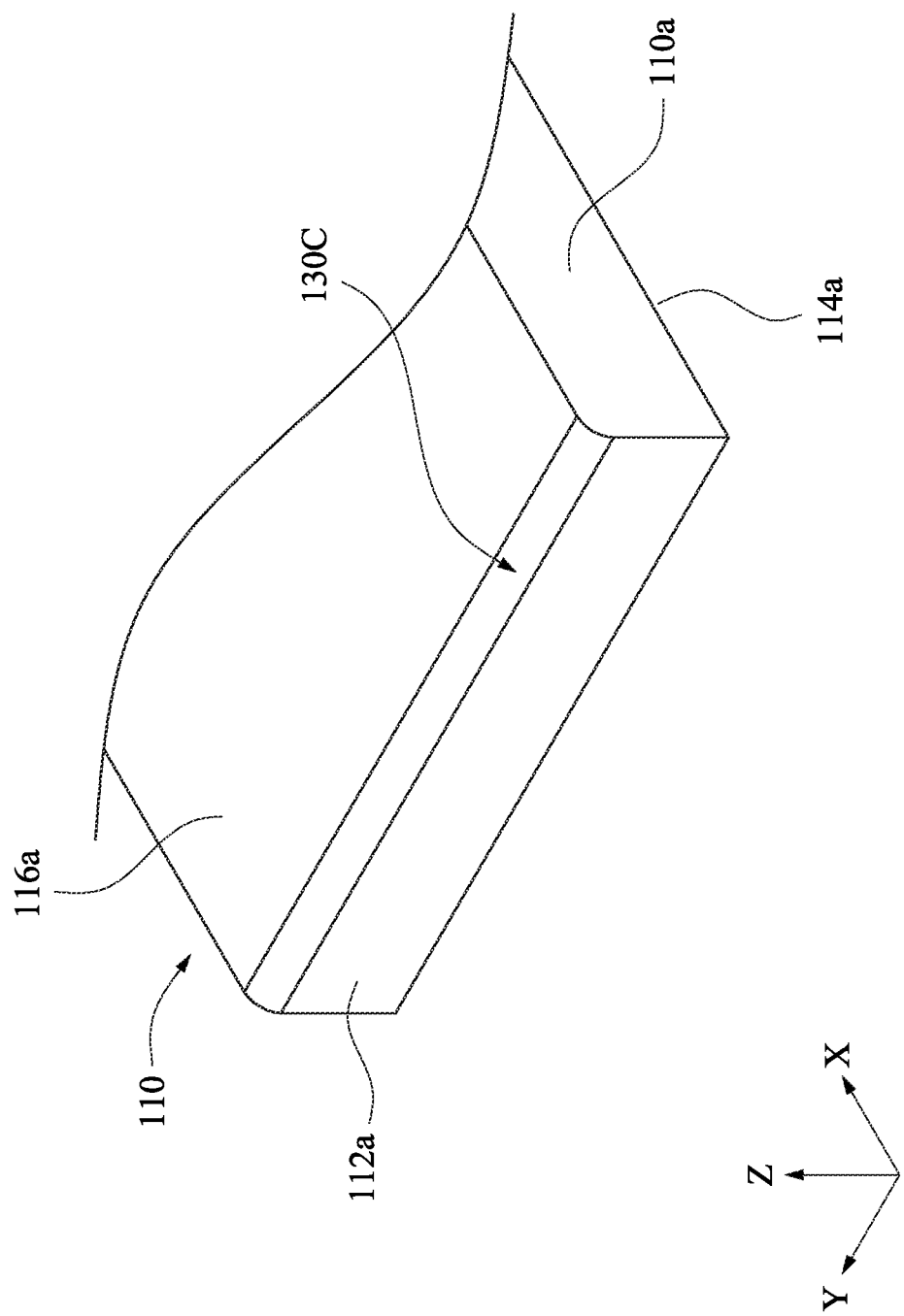
FIG. 10 is a schematic view of the light guide structure with the rounded edges in accordance with an embodiment of present disclosure.

Reference is made to FIG. 10. FIG. 10 is a schematic view of the rounded edge 130C according to an embodiment of the present disclosure. In some embodiments, as shown in FIG. 10, the rounded edge 130C is only connected between the non-light-emitting surface 112a and the light emitting surface 116a. In some embodiments, the rounded edge 130C may also be connected only between the non-light-emitting surface 112b and the light emitting surface 116a. In some embodiments, the rounded edge 130C may also be connected only between the non-light-emitting surface 112c and the light emitting surface 116a.

Figure 11:
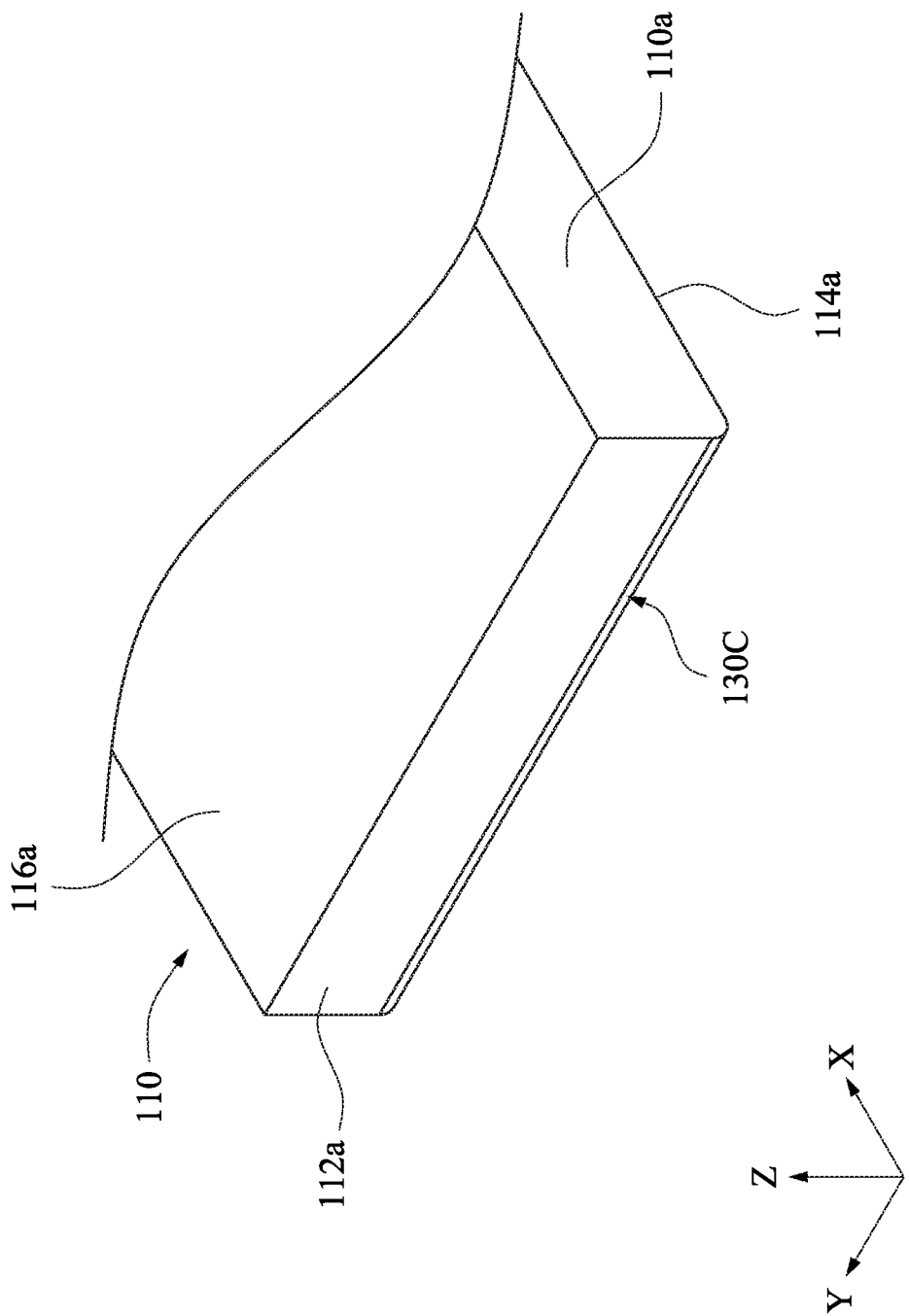
FIG. 11 is a schematic view of the light guide structure with the rounded edges in accordance with an embodiment of present disclosure.

Reference is made to FIG. 11. FIG. 11 is a schematic view of the rounded edge 130C according to an embodiment of the present disclosure. In some embodiments, as shown in FIG. 10, the rounded edge 130C is only connected between the non-light-emitting surface 112a and the reflective surface 114a. In some embodiments, the rounded edge 130C may also be connected only between the non-light-emitting surface 112b and the reflective surface 114a. In some embodiments, the rounded edge 130C may also be connected only between the non-light-emitting surface 112c and the reflective surface 114a.

With the aforementioned structural configuration, the light emitting unit 120 emits the light L toward the light guide plate 110, and the light L is scattered through the rounded edges 130C disposed on the edges of the light guide plate 110, and the brightness of the dark area DA is increased about 14% relative to the brightness of the dark area DA without the rounded edges 130C. The light guide structure 100 provided with the rounded edges 130C can achieve the effect of increasing the light extraction efficiency.

In some embodiments, the rounded edges 130C are formed by a hot pressing process, an injection process, or a UV Imprinting process.

In some embodiments, the light guide structure 100 may be provided with the micro-structures 130A located on the non-light-emitting surface 112a and/or the non-light-emitting surface 112b and/or the non-light-emitting surface 112c and the rounded edges 130C located on the edges of the light guide plate 110 at the same time.

From the above detailed description of the specific embodiments of the present disclosure, it can be clearly seen that in the light guide structure of the present disclosure, since the light guide structure is provided with micro-structures and/or rounded edges, light can be scattered in the light guide plate, except that the brightness of the dark area can be compensated, the light extraction efficiency of the light guide structure can also be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A light guide structure, comprising:
a light guide plate having a light incident surface, a plurality of non-light-emitting surfaces, a reflective surface, and a light emitting surface, wherein the light incident surface and one of the non-light-emitting surfaces are oppositely disposed, and the reflective surface and the light emitting surface are oppositely disposed;
a light emitting unit configured to emit light through the light incident surface; and
a plurality of micro-structures disposed on the non-light-emitting surfaces and configured to scatter the light, and the micro-structures are partially overlapped in a plan view of each of the non-light-emitting surfaces.

2. The light guide structure of claim 1, wherein the micro-structures protrude outward from the non-light-emitting surfaces.

3. The light guide structure of claim 1, wherein the micro-structures are recessed inward from the non-light-emitting surfaces.

4. The light guide structure of claim 1, wherein a cross section of the micro-structures on the non-light-emitting surfaces is circular.

5. The light guide structure of claim 1, wherein the micro-structures are formed by a hot pressing process, an injection process, or a UV imprinting process.

6. The light guide structure of claim 1, further comprising a rounded edge connected between one of the non-light-emitting surfaces and the light emitting surface.

7. The light guide structure of claim 1, further comprising a rounded edge connected between one of the non-light-emitting surfaces and the reflective surface.

8. The light guide structure of claim 1, further comprising a rounded edge connected between one of the non-light-emitting surfaces and the light emitting surface and between one of the non-light-emitting surfaces and the reflective surface.

9. A light guide structure, comprising:
a light guide plate having a light incident surface, a plurality of non-light-emitting surfaces, a reflective surface, and a light emitting surface, wherein the light incident surface and one of the non-light-emitting surfaces are oppositely disposed, and the reflective surface and the light emitting surface are oppositely disposed;
a light emitting unit configured to emit light through the light incident surface; and
a plurality of micro-structures disposed on the non-light-emitting surfaces and configured to scatter the light, and the micro-structures are arc-shaped cylinders,
wherein the micro-structures have a width extending parallel to the non-light-emitting surfaces and a distance in between extending parallel to the non-light-emitting surfaces, and the distance is greater than 0 and less than or equal to 10 times the width.

10. The light guide structure of claim 9, wherein a cross section of the micro-structures parallel to the reflective surface or the light emitting surface is semicircular.

11. The light guide structure of claim 9, wherein the micro-structures are elongated in a direction extending from the reflective surface to the light emitting surface.

12. The light guide structure of claim 9, wherein the micro-structures have a height extending perpendicular to the non-light-emitting surfaces, and the height is smaller than the width.

13. A light guide structure, comprising:
a light guide plate having a light incident surface, a plurality of non-light-emitting surfaces, a reflective surface, and a light emitting surface, wherein the light incident surface and one of the non-light-emitting surfaces are oppositely disposed, and the reflective surface and the light emitting surface are oppositely disposed;
a light emitting unit configured to emit light through the light incident surface; and
a rounded edge connected between one of the non-light-emitting surfaces and the light emitting surface or between one of the non-light-emitting surfaces and the reflective surface and configured to scatter the light, wherein each of the non-light-emitting surfaces is a flat surface.

14. The light guide structure of claim 13, wherein the rounded edge is connected between one of the non-light-emitting surfaces and the light emitting surface.

15. The light guide structure of claim 13, wherein the rounded edge is connected between one of the non-light-emitting surfaces and the reflective surface.

16. The light guide structure of claim 13, wherein the rounded edge is connected between one of the non-light-emitting surfaces and the light emitting surface and between one of the non-light-emitting surfaces and the reflective surface.

* * * * *